(12) United States Patent
Varma et al.

(10) Patent No.: US 8,029,662 B2
(45) Date of Patent: Oct. 4, 2011

(54) SORBENT COMPOSITIONS AND DESULFURIZATION METHOD USING THE SAME

(75) Inventors: Rajender S. Varma, Cincinnati, OH (US); Yuhong Ju, Cincinnati, OH (US); Subhas Sikdar, Cincinnati, OH (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 592 days.

(21) Appl. No.: 12/134,536

(22) Filed: Jun. 6, 2008

(65) Prior Publication Data

US 2008/0257785 A1    Oct. 23, 2008

Related U.S. Application Data

(62) Division of application No. 11/300,856, filed on Dec. 15, 2005, now abandoned.

(51) Int. Cl.
*C10G 25/05* (2006.01)

(52) U.S. Cl. .............. 208/250; 502/64; 502/68; 502/72; 502/80; 502/405; 502/406; 502/407; 502/411; 502/414; 502/415; 208/208 R

(58) Field of Classification Search .............. 502/63–64, 502/68, 72–73, 80, 405–407, 411, 414–415; 208/208 R, 244–245, 250
See application file for complete search history.

(56) References Cited

OTHER PUBLICATIONS

Rossi et al. (2003). Applied Catalysis A: General, 250, 271-278.*
Massam et al. (1998). Applied Catalysis A: General, 172, 259-264.*

* cited by examiner

*Primary Examiner* — Walter Griffin
*Assistant Examiner* — Brian McCaig
(74) *Attorney, Agent, or Firm* — Weiss & Moy, PC

(57) ABSTRACT

The disclosed sorbents are for adsorbing sulfur compounds, particularly sulfur-containing aromatic compounds, from liquid hydrocarbon fuels such as gasoline, cracked gasoline, diesel, high sulfur liquid fossil fuels, ultra-low sulfur fuel (ULSF) in fuel cell applications, and mixtures thereof. The sorbent compositions comprise one or more silicates having one or more metal nitrates admixed together. The one or more metal nitrates include iron (II) or (III), zinc (II), cadmium (II) and mercury (II) nitrate. The method of preparing and using the sorbents is also provided.

20 Claims, 1 Drawing Sheet

Representative sulfur-containing compounds in transportation fuel

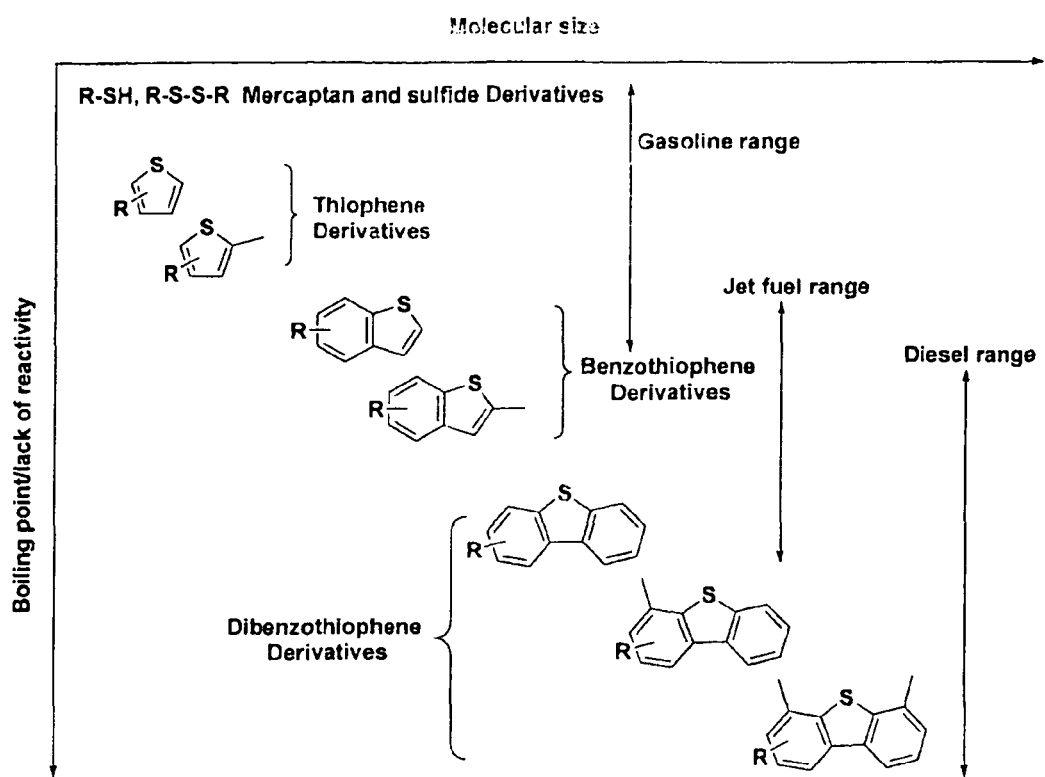
Figure 1. Representative sulfur-containing compounds in transportation fuel

SORBENT COMPOSITIONS AND DESULFURIZATION METHOD USING THE SAME

RELATED APPLICATION

This is a divisional application of U.S. patent application Ser. No. 11/300,856 filed Dec. 15, 2005, now abandoned, and to which priority is claimed.

FIELD OF THE INVENTION

This invention relates generally to pollution control. More specifically, this invention relates to sorbent compositions, their preparation and use for substantially reducing the amount of sulfur compounds in liquid hydrocarbon fuels.

BACKGROUND OF THE INVENTION

Sulfur compounds in liquid hydrocarbon fuels have been linked to serious human health and environmental problems. For example, sulfur is a well known poison for catalytic converters in motor vehicles and the resulting $SO_X$ in exhaust gas is a major contributor to air pollution. Emissions from poisoned catalytic converters may contain high levels of combusted hydrocarbons, oxides of nitrogen and/or carbon monoxide which, when catalyzed by sunlight, form ground level ozone, referred to as smog. Consequently, rigorous efforts are currently underway in both European countries as well as in the United States of America[1,2] to reduce the sulfur content in liquid hydrocarbon fuels from the current levels of 300-500 ppmw total sulfur down to 15-30 ppmw (15 ppmw of total sulfur for diesel fuel and 30 ppmw total sulfur for gasoline). More recently, the need for ultra-low-sulfur fuels in fuel cell application is also getting more and more important—the total sulfur concentration in liquid fuel has to be reduced to less than 1 ppmw for proton exchange membrane fuel cell and below 10 ppmw for solid oxide fuel cell.

The U.S. Environmental Protection Agency has established stringent sulfur control programs for gasoline and diesel fuel. The Tier 2 gasoline sulfur control program started in 2004 requires that, by 2006, all U.S. gasoline must have an average sulfur content $\leq$30 ppm. The Ultra-Low-Sulfur Diesel (ULSD) program begins in 2006 and requires that highway diesel fuel must have a maximum sulfur content $\leq$15 ppm. Consequently, deep desulfurization is becoming a great challenge for environmental chemists, the petroleum refining industry, and others. As used herein, "ultra-low sulfur diesel fuel" is defined as having a maximum sulfur content $\leq$15 ppm.

Ultra-low-sulfur diesel fuel (ULSD), less than 10 ppm total sulfur content in Europe (while $\leq$15 ppm in North America) has been produced in a hydrotreating facility based on Syn-Technology at Scanraff, Sweden. Sweden was the first country to impose very strict quality specifications for diesel fuel, requiring a minimum 50 cetane number, a maximum of 10 ppm on sulfur content, and a maximum 5 percent on aromatics content. Other European countries are encouraging the early introduction of very-low-sulfur diesel fuel ahead of the shift to a European Union requirement for 50 ppm diesel in 2005. The United Kingdom and Germany have structured tax incentives for the early introduction of 50 ppm diesel fuel and have discussed incentives for introduction of a 10 ppm diesel fuel. BP's refinery at Grangemouth, United Kingdom uses a new higher activity AK30 Nobel catalyst (KF757) to produce 10 to 20 ppm sulfur diesel product. In the United States, Arco (BP Amoco) announced that it would produce a premium diesel fuel termed "EC Diesel" with less than 10 ppm at its Carson, Calif., refinery.

The production of ultra low sulfur diesel (ULSD) fuel for clean, complete combustion and low emissions is of great significance. Diesel fuel is used for many tasks. In agriculture, diesel fuels more than two-thirds of all farm equipment in the United States, because diesel engines can perform demanding work. In addition, it is the most widely used fuel for public buses and school buses throughout the United States. America's construction industry depends on diesel's power. Diesel engines are able to do demanding construction work, like lifting steel beams, digging foundations and trenches, drilling wells, paving roads and moving soil, safely and efficiently. Diesel also powers the movement of America's freight in trucks, trains, boats and barges; 94 percent of American goods are shipped using diesel-powered vehicles. No other fuel can currently match diesel in its ability to move freight economically.

The removal of sulfur-containing compounds from liquid fuels in the petroleum industry is currently achieved by hydrodesulfurization (HDS) with a Co—Mo/$Al_2O_3$ or Ni—Mo/$Al_2O_3$ catalyst or by an adapted HDS process (e.g. by improving catalytic activity, increasing the process severity such as hydrogen pressure or designing new reactor configurations). HDS is highly efficient in removing thiols, sulfides, and disulfides but is less effective for refractory sulfur-containing aromatic thiophene, benzothiophene and dibenzothiophene and their alkylated derivatives as depicted in FIG. 1, especially those containing functional groups that hinder the ring sulfur atoms (i.e., 4,6-dimethyl-dibenzothiophene). The difficulty in their removal may be due to their aromaticity (stability and inactivity) and the steric hindrance. For diesel fuel, it is very difficult for the current hydrotreating technology to reduce the sulfur content to less than 50 ppmw, because the remaining sulfur compounds in current diesel fuel with 500 ppmw total sulfur level are mostly the refractory sulfur compounds which are difficult to remove. Consequently, the sulfur content in gasoline cannot be reduced to less than 30 ppmw by current hydrotreating processes. The major problem for deep desulfurization of hydrocarbon fuels is that the current hydrotreating technology results in high hydrogen consumption and significant reduction of octane number due to olefin saturation. Particularly, desulfurization of fluid catalytic cracking (FCC) gasoline (containing 20-40 wt. % olefins) demands adsorbents of high selectivity to substantially reduce the amount of sulfur components while maintaining a minimum olefin saturation to provide a good octane number. In order to carry out deep removal of the sulfur compounds that account for only less than 1 percent of the fuel, 100 percent of the fuel needs to be processed at high temperatures under elevated pressures using hydrogen gas. The HDS process typically requires expensive catalysts, hydrogen gas, high-pressure equipment (up to 1,000 psig) and high-temperature (400-550° C.) to help produce environmentally-friendly low sulfur fuels.

Other approaches used to generate low sulfur fuels include costly biodesulfurization using bacteria that removes sulfur as a water soluble sulfate salt. In other approaches, sulfur oxidation using emulsified hydrogen peroxide has been pursued which requires extra post-processing to separate the oxidized sulfone (Unipure Corporation) and the Fischer-Tropsch process that produces non-oil-based synthetic diesel from natural gas. None of these approaches has been entirely satisfactory.

Sorbents have been also been developed to generate low sulfur fuels via sulfur adsorption. For example, Ag (I), Cu(I), Ni(II) and other transition metal exchanged Y zeolite-based adsorbents that allegedly work via π-complexation have been developed by two leading research groups of Song[3] and Yang[4] on a bench scale. The limitation of the π-complexation-based sorbents is lack of selectivity, because other olefinic and aromatic hydrocarbons in liquid transportation fuel can also be absorbed via π-complexation, thereby causing difficulty in maintaining a fairly good octane and cetane number. The use of clay minerals in sorbents has been studied as clay minerals occur abundantly in nature and because of their high surface area, adsorptive and ion-exchange properties, they have been studied for catalytic applications,[5,6] in soil chemistry as well as effective sorbents for various water pollutants and are particularly cost effective. Clay-supported copper (II) and iron (III) nitrates (Claycop and Clayfen) have demonstrated unique oxidizing properties in organic synthesis. In Claycop and Clayfen, the copper and iron nitrates are immobilized on the clay surface by strict preparation techniques including dissolution of the metal nitrates in acetone, followed by careful removal of the solvent under reduced pressure to immobilize the salts on the clay surface. Clayfen is unstable, decomposes rapidly with the evolution of gas. The clay and metal nitrates are present in about a 1:1 weight ratio for both Claycop and Clayfen.

Accordingly, there is a need for a composition and method for effective and cost-efficient desulfurization of liquid hydrocarbon fuels including transportation fuels. There is another need for a composition and method to substantially reduce the refractory sulfur-containing aromatics from liquid hydrocarbon fuels. There is also a need for a composition and method for post-treating technology (polishing) to selectively remove residual sulfur compounds from liquid hydrocarbon fuels after a hydrodesulfurization (HDS) process to produce ultra low sulfur fuels. There is a further need for a composition and method that substantially removes a maximum amount of the sulfur components from fuels while substantially maintaining olefin and other hydrocarbon saturation to provide a good octane number. There is a still further need for a composition and method that is less expensive and more selective than the existing hydrodesulfurization (HDS) process and the transition metal exchanged zeolite sorbents. An additional need for a novel composition and method exists to produce low/ultra low sulfur liquid hydrocarbon fuels. A still further need exists for a sulfur removal composition and method that can be tailored for both refinery and non-refinery applications including on-site and on-board sulfur removal for fuel cell applications. The present invention fulfills these needs and provides other related advantages.

SUMMARY OF THE INVENTION

The present invention is concerned with sorbent compositions, a method of making sorbent compositions, and a method of using the sorbent compositions for the substantial removal of sulfur-compounds from liquid hydrocarbon fuels, particularly sulfur-containing aromatic compounds. As used herein, "liquid hydrocarbon fuels" means gasoline, cracked gasoline, diesel fuel, high sulfur liquid fossil fuel and ultra-low sulfur fuel (ULSF) in fuel cell applications and mixtures thereof. The sorbent composition generally comprises one or more silicates with oxidative metal nitrates on the surface of the one or more silicates. The one or more silicates may be natural or synthetic. The one or more silicates may be selected from the group consisting of clays such as montmorillonite, laumonite, bentonite, Mica, vermiculite and kaolinite, and from silica gels, natural and synthetic molecular sieves, zeolites, and activated alumina. The particle size of the preferred silicates used ranges from about 10 to about 100 micrometers, preferably about 50 micrometers. The active metal nitrates are selected from the group consisting of $Fe(NO_3)_2$, $Fe(NO_3)_3$, $Cd(NO_3)_2$ and $Hg(NO_3)_2$ and mixtures thereof.

The preparation comprises the step of admixing the metal nitrate(s) and the one or more silicates by suspending, grinding or otherwise contacting the metal nitrate(s) with the silicate(s) particles to produce the powdered solid sorbent for use in the desulfurization method.

The desulfurization method generally comprises the step of contacting the sorbent composition described herein or the components thereof with a sulfur-containing liquid hydrocarbon fuel such as transportation fuels to thereby produce a low or ultra low sulfur fuel and a sulfurized sorbent.

When the sorbent composition or components thereof are contacted with the sulfur-containing liquid hydrocarbon fuel in the desulfurization zone, sulfur compounds, particularly sulfur-containing aromatic thiophene, benzothiophene and dibenzothiophene and their alkylated derivatives present in the sulfur-containing hydrocarbon fuel are substantially removed from such fuel to produce low sulfur fuel of 15-30 ppm. If the transportation fuel has already undergone treatment by hydrosulfurization, the sulfur compounds will be further reduced by this process to produce ultra low sulfur diesel (ULSD) of less than 15 ppm sulfur and ultra low sulfur gasoline (ULSG) of less than 30 ppm sulfur.

Other features and advantages of the present invention will become apparent from the following more detailed description, taken in conjunction with the accompanying drawing which illustrates, by way of example, the principles of the invention.

BRIEF DESCRIPTION OF THE DRAWINGS

The accompanying drawing illustrates the invention. In such drawing:

FIG. 1 illustrates representative sulfur-containing compounds in transportation fuel.

DETAILED DESCRIPTION OF THE PREFERRED EMBODIMENTS

The present invention is concerned with a sorbent composition, a method of making a sorbent composition, and a method of using a sorbent composition for the removal of sulfur compounds from liquid hydrocarbon fuels.

In accordance with a first embodiment of the present invention, a novel sorbent composition suitable for substantially removing sulfur compounds from liquid hydrocarbon fuels is provided. The sorbent composition generally comprises one or more silicates admixed with one or more oxidative metal nitrates. As used herein, "liquid hydrocarbon fuels" as used herein means gasoline, cracked gasoline, diesel, high sulfur liquid fossil fuels, and ultra-low sulfur fuel (ULSF), the latter being used in fuel cell applications. The term "liquid hydrocarbon fuels" includes transportation fuels. As used herein, "sulfur compounds" includes sulfur-containing aromatic thiophene, benzothiophene and dibenzothiophene and their alkylated derivatives.

As used herein, the one or more silicates may be natural or synthetic. The one or more silicates may be selected from the group consisting of clays such as montmorillonite, laumonite, bentonite, Mica, vermiculite and kaolinite, and from silica gels, natural and synthetic molecular sieves, zeolites, and activated alumina. In the mixture, montmorillonite K10 clay may be in more than 50% (w) and the bulk density of the sorbent composition in the range of 0.5-0.9 $g/cm^3$. The particle size of the preferred silicates used ranges from about 10 to about 100 micrometers, preferably 50-100 micrometers. Porous and layered aluminosilicates are inexpensive and well dispersed particles affording fast adsorptive kinetics within a very short contact time which renders them feasible sorbents in the industrial desulfurization process.

The one or more metal nitrates may be uniformly admixed with the host silicate(s). Fe(II), Fe(III), Cd(II) and Hg(II) are the preferred metals. The one or more oxidative metal nitrates may be selected from the group consisting of $Fe(NO_3)_2$, $Fe(NO_3)_3$, $Cd(NO_3)_2$ and $Hg(NO_3)_2$. The one or more oxidative metal nitrates comprise about 5 to about 35% weight percent of the sorbent. 10% metal nitrate is the preferred weight percent. The preferred sorbent has an average surface area of about 50 to about 350 $m^2/g$.

While not wishing to be bound by any one theory, it is believed that the silicate-supported metal nitrates catalytically oxidize thiophene and benzothiophene derivatives from refractory aromatic sulfur compounds in the liquid hydrocarbon fuels to more polar sulfones and sulfoxides and promote the sequential adsorption onto the surfaces of the porous silicates linked by sulfur affinitive metal cations as the bridge.

In accordance with a second embodiment of the present invention, the preparation of the novel sorbent compositions is also provided. Generally, the preparation comprises the step of admixing the metal nitrate(s) and the one or more silicates by suspending, grinding or otherwise contacting the metal nitrate(s) with the silicate particles to produce the powdered solid sorbent. The substantially easy preparation of the novel sorbents from very inexpensive naturally occurring silicates and readily available metal nitrate salts by dry mixing and/or contacting techniques as hereinafter described is particularly advantageous.

In accordance with a third embodiment of the present invention, a desulfurization method is provided which employs the novel sorbent compositions described herein. In the inventive desulfurization method, the novel sorbent composition is contacted with a sulfur-containing liquid hydrocarbon fuel to thereby form a low or ultra low sulfur fuel and a sulfurized sorbent. The sulfur-containing liquid hydrocarbon fuel employed in the desulfurization method of the present invention includes gasoline, cracked-gasoline, diesel fuel, other sulfur-containing liquid fossil fuels, ultra-low sulfur fuel (ULSF) in fuel cell applications, and mixtures thereof. Examples of suitable sulfur-containing liquid fossil fuels include, but are not limited to gasoline, cracked gasoline, diesel, and jet fuel.

As used herein, the term "gasoline" means a complex mixture of relatively volatile hydrocarbons, with or without small quantities of additives suitable for use in spark-ignition engines. Motor gasoline includes both leaded and unleaded grades of finished motor gasoline, blending components and gasohol, which is motor gasoline blended with up to 10 percent ethanol or methane with an Octane Number (RON) or octane rating of 87 to 98. Examples of suitable gasolines include, but are not limited to, catalytic gasoline, aviation gasoline, cracked gasoline and other high sulfur liquid fossil fuels, etc.

As used herein, the term "cracked gasoline" means gasoline produced from a catalytic cracker with a moderate octane number, high olefins (alkene) content and moderate aromatics level.

As used herein, the term "diesel fuel" means fuel obtained through the partial distillation of crude oil. Diesel fuel is ignited in an internal combustion engine cylinder by the heat of air under high compression—in contrast to motor gasoline, which is ignited by electrical spark. Because of the mode of ignition, a high cetane number is required in a good diesel fuel. Diesel fuel also often contains higher quantities of mineral compounds and sulfur. Diesel fuel contains between 18 and 30 percent more energy per gallon than gasoline. Diesel technology also offers a greater power density than other fuels, so it packs more power per volume.

The desulfurization method may be used in a batch reactor, slurry reactor, packed bed reactor, fluidized bed reactor, or in a fixed bed reactor. It is preferred that the desulfurization reaction of the present invention be carried out in the reaction zone of a fixed bed reactor. As used herein, the term "fixed bed reactor" means a cylindrical tube, randomly filled with sorbent particles. During operation, a liquid fuel flows through the tube and over the sorbent particles, where adsorption takes place into the sorbent. The size of the sorbent particles ranges from about 10 to about 100 micrometers, preferably about 50 to about 100 micrometers, enabling the sorbent to be easily packed into a fixed bed and minimizing the amount of sorbent needed by thorough mixing in a short residence time. The disclosed sorbent is for desulfurization in the temperature range of 20 to 50° C. of sulfur containing liquid hydrocarbon fuels.

When the sorbent composition is contacted with the sulfur-containing liquid hydrocarbon fuels in the desulfurization zone, sulfur compounds, particularly sulfur-containing aromatic thiophene, benzothiophene and dibenzothiophene and their alkylated derivatives present in the sulfur-containing fuel are substantially removed from such fuel to produce low sulfur fuel of about 15 to about 30 ppm. If the liquid hydrocarbon fuel has already undergone treatment by hydrosulfurization, the sulfur compounds will be further reduced by this process to produce low sulfur fuel of about 15 or about 30 ppm or ULSD of below 15 ppm and ULSG of below 30 ppm to meet the regulation for ULSD and ULSG Tier 2 gasoline, respectively.

The sulfurized sorbent may be regenerated by adding 5-25 wt % of metal nitrate to the sulfurized sorbent to activate the spent sorbent (i.e. the sulfurized sorbent) by physically mixing/grinding at room temperature of about 25-30° C. as hereinafter described.

The following examples are presented to further illustrate the invention and are not to be construed as unduly limiting the scope of this invention.

WORKING EXAMPLES (All adsorption experiments have been replicated to reach a less than 5% total sulfur adsorption capacity difference):
Preparation of Sorbent (Dry Premixing)

The preparation of iron (III) nitrate nonahydrate-doped Montmorillonite K10 clay is representative: iron (III) nitrate nonahydrate (Aldrich Chemical Co., Milwaukee, Wis.) (0.020 g) was contacted with Montmorillonite K10 clay (Aldrich Chemical Co., Milwaukee, Wis.) (0.200 g) in a mortar and pestle. Alternatively, they were physically mixed in a glass vial for batch adsorption tests. After thorough mixing at room temperature (25-30° C.), the sorbent was added to the jet fuel or diesel.
Alternative Method (Preferred)

5 ml of model gasoline, jet fuel or diesel was added to 0.200 g of clay and 0.020-0.040 g of metal nitrate (10-20% metal nitrate loading) in a 15 mL capped sample vial equipped with a magnetic stirring bar using a 5.0 mL measuring pipette, the mixture stirred at room temperature (25-30° C.) for a period of three hours to reach equilibrium.

The commercial gasoline and diesel samples were analyzed for refractory sulfur compounds using a Finnigan Trace GC ultra system available from Thermo Electron Corporation of Somerset, N.J. equipped with a Flame Photometric Detector (FPD) via a multi-points calibration method described by Yang et al.[4] Alternatively, the total sulfur concentration of the commercial and sorbent treated fuels can also be determined using a Total Sulfur Analyzer (TS 3000, available from Thermo Electron Corporation, Somerset, N.J.).

Sulfur removal capacity of the adsorbents was evaluated using an HP 6890 GC system with HP 5872 Mass selective detector (for model liquid hydrocarbon fuels). The experimental results are as follows:

Results:

Deep desulfurization of a model diesel fuel using silicates such as montmorillonite K10 clay (Aldrich Chemical Co., Milwaukee, Wis.), neutral alumina (Fisher Scientific, Fair Lawn, N.J.), molecular sieves 13× (Fisher Scientific, Fair Lawn, N.J.) and silica gel (Aldrich Chemical Co., Milwaukee, Wis.) comparing to Calgon activated carbon (Calgon Carbon Corp. Pittsburgh, Pa.) is listed in Table 1, iron nitrate nanohydrate (Aldrich Chemical Co., Milwaukee, Wis.) and mercury nitrate monohydrate (Aldrich Chemical Co., Milwaukee, Wis.) are evaluated as active metal nitrate salts.

Model Diesel Fuel Sulfur Contents (In Hexanes)

250 ppmw sulfur from 2-methylbenzothiophene, 2-MBT 370 ppmw sulfur from 4,6-dimethylbenzothiophene 4,6-DMDBT

TABLE 1

Deep desulfurization of a model diesel fuel using metal nitrates and silicates

| Entry | Description of sorbents and sorbents usage (M g/Sorbent g/Diesel mL) | Final Sulfur ppm[a] | Adsorption capacity (mg S/g of sorbents) | Sorbent efficiency mL diesel/g sorbent mmol S/mmol Metal |
|---|---|---|---|---|
| 1 | Hg(NO$_3$)$_2$·H$_2$O 0.034 g/5.0 mL | 250 ppm 2-MBT 370 ppm 4,6-DMDBT | 0 | 25 mL/g 0 |
| 2 | Fe(NO$_3$)$_3$·9H$_2$O 0.040 g/5.0 mL | 250 ppm 2-MBT 370 ppm 4,6-DMDBT | 0 | 25 mL/g 0 |
| 3 | Calgon Activated carbon (AC) 0.2 g/5.0 mL | 47.8 ppm 2-MBT N.D. 4,6-DMDBT | 14.29 | 25 mL/g 0 |
| 4 | Hg-impregnated AC 0.034 g/0.2 g/5.0 mL | 57.4 ppm 2-MBT N.D. 4,6-DMDBT | 14.02 | 25 mL/g 0.882/1 |
| 5 | Hg(NO$_3$)$_2$·H$_2$O + AC 0.035 g/0.2 g/5.0 mL | N.D. 2-MBT N.D. 4,6-DMDBT | 15.42 | 25 mL/g 0.942/1 |
| 6 | Hg(NO$_3$)$_2$·H$_2$O + Clay 0.035 g/0.2 g/5.0 mL | 33.4 ppm 2-MBT 261.0 ppm 4,6-DMDBT | 8.14 | 25 mL/g 0.498/1 |
| 7 | Fe(NO$_3$)$_3$·9H$_2$O + AC 0.040 g/0.2 g/5.0 mL | 42.0 ppm 2-MBT N.D. 4,6-DMDBT | 14.45 | 25 mL/g 0.910/1 |
| 8 | Fe(NO$_3$)$_3$·9H$_2$O + Clay 0.040 g/0.2 g/5.0 mL | N.D. 2-MBT N.D. 4,6-DMDBT | 15.50 | 25 mL/g 0.978/1 |
| 9 | Fe(NO$_3$)$_3$·9H$_2$O + Silica 0.040 g/0.2 g/5.0 mL | 77.8 ppm 2-MBT 166.7 ppm 4,6-DMDBT | 9.39 | 25 mL/g 0.593/1 |
| 10 | Fe(NO$_3$)$_3$·9H$_2$O + Alumina 0.040 g/0.2 g/5.0 mL | 227 ppm 2-MBT 314 ppm 4,6-DMDBT | 1.98 | 25 mL/g 0.125/1 |
| 11 | Fe(NO$_3$)$_3$·9H$_2$O + M.S. 0.040 g/0.2 g/5.0 mL | 175 ppm 2-MBT 276 ppm 4,6-DMDBT | 4.23 | 25 mL/g 0.267/1 |

[a]The low detection limit in this method using GC/MS is 2.5 ppmw of 2-MBT and 3.7 ppmw 4,6-DMDBT;
N.D. = Not detectable.

A polishing process to treat low sulfur bearing model fuel containing 30 ppm (μg/mL) of refractory 4,6-dimethyldibenzothiophene (4,6-DMDBT) is described in Table 2

Low Sulfur Containing Model Fuel for Polishing.

31 ppmw sulfur from 4,6-Dimethyldibenzothiophene (4,6-DMDBT)

TABLE 2

Polishing after hydrodesulfurization (HDS)

| Entry | Description of sorbents | Final Sulfur ppm[a] | Adsorption capacity (mg S/g of sorbents) |
|---|---|---|---|
| 1 | Calgon Activated carbon (AC) | N.D. | 0.775 |
| 2 | Fe-impregnated AC | N.D. | 0.775 |
| 3 | Hg-impregnated AC | N.D. | 0.775 |
| 4 | Cd-impregnated AC | N.D. | 0.775 |
| 5 | Silica gel | 31 ppm | 0 |
| 6 | Silica + Fe(NO$_3$)$_3$·9H$_2$O | 27 ppm | 0.078 |
| 7 | Silica + Hg(NO$_3$)$_2$·H$_2$O | N.D. | 0.775 |
| 8 | K10 clay + Fe(NO$_3$)$_3$·9H$_2$O | N.D. | 0.775 |

[a]The low detection limit in this method using GC/MS is below 1 ppmw of 4,6-DMDBT;
N.D. = Not detectable.

From the testing results in Table 1, it was found that the combination of metal nitrate and K10 clay showed the highest sulfur removal capacity (Entry 8 in Table 1). The optimized sorbent composition of metal nitrate loading is shown in Table 3 (Entries 2 and 3).

Model Diesel Fuel Sulfur Contents (In Hexanes):

250 ppmw sulfur from 2-methylbenzothiophene, 2-MBT 370 ppmw sulfur from 4,6-dimethylbenzothiophene 4,6-DMDBT

TABLE 3

Optimized amount of clay and Fe(NO$_3$)$_3$•9H$_2$O for deep desulfurization

| Entry | Fe(NO$_3$)$_3$•9H$_2$O + Clay Fe(g)/sorbent(g)/diesel (mL) | Final Sulfur ppm$^a$ | mg S/g of sorbents | Sorbent efficiency mmol S/mmol M |
|---|---|---|---|---|
| 1 | 0.01/0.2/5 mL | 180 ppm 2-MBT<br>98 ppm 4,6-DMDBT | 8.55 | 2.159/1 |
| 2 | 0.02/0.2/5 mL | N.D. | 15.50 | 1.957/1 |
| 3 | 0.04/0.2/5 mL | N.D. | 15.50 | 0.978/1 |
| 4 | 0.06/0.2/5 mL | N.D. | 15.50 | 0.652/1 |
| 5 | 0.08/0.2/5 mL | N.D. | 15.50 | 0.489/1 |
| 6 | 0.10/0.2/5 mL | N.D. | 15.50 | 0.391/1 |
| 7 | 0.02/0.2/10 mL<br>(50 mL/g) | 119 ppm 2-MBT<br>18 ppm 4,6-DMDBT | 24.15 | 3.047/1 |
| 8 | 0.01/0.1/10 mL<br>(100 mL/g) | 184 ppm 2-MBT<br>162 ppm 4,6-DMDBT | 27.40 | 3.459/1 |

$^a$The low detection limit in this method using GC/MS is 2.5 ppmw of 2-MBT and 3.7 ppmw 4,6-DMDBT;
N.D. = Not detectable.

The results in Table 4 show that the oxidative adsorption of refractory sulfur compounds via sulfur affinitive metal is an efficient and selective desulfurization method which removes sulfur-containing aromatic compounds from liquid fuel and retains olefinic hydracarbons such as 1-octene and other aromatic compounds such as naphthalene in the liquid fuel. In contrast, activated carbon removed useful hydrocarbons (naphthalene and 1-octene) indiscriminately.

Model Diesel Fuel Composition for Selectivity (In Dichloromethane):
150 ppmw sulfur from 2-methylbenzothiophene, 2-MBT
150 ppmw sulfur from 4,6-dimethylbenzothiophene 4,6-DMDBT
400 ppmw 1-octene as olefinic representative
400 ppmw naphthalene (NP) as aromatic hydrocarbon representative

TABLE 4

Deep desulfurization and selectivity towards sulfur compounds

| Entry | Description of sorbents and sorbents usage (M g/Sorbent g/Diesel mL) | Final Sulfur ppm$^a$ | Adsorption capacity (mg S/g of sorbents) |
|---|---|---|---|
| 1 | Calgon activated carbon (AC) | 400 ppmw 1-octene<br>240 ppm NP<br>105 ppm 2-MBT<br>7.5 ppm 4,6-DMDBT | 4.3 |
| 2 | AC + Fe(NO$_3$)$_3$•9H$_2$O | 380 ppmw 1-octene<br>244 ppm NP<br>110 ppm 2-MBT<br>9.0 ppm 4,6-DMDBT | 4.1 |
| 3 | AC + Hg(NO$_3$)$_2$•H$_2$O | 160 ppmw 1-octene<br>296 ppm NP<br>108 ppm 2-MBT<br>22.5 ppm 4,6-DMDBT | 3.9 |
| 4 | Montmorillonite K10 clay | 400 ppmw 1-octene<br>400 ppm NP<br>150 ppm 2-MBT<br>150 ppm 4,6-DMDBT | 0 |
| 5 | Fe(NO$_3$)$_3$•9H$_2$O + clay 0.043 g/0.2 g/5.0 mL | 364 ppmw 1-octene<br>396 ppm NP<br>N.D. 2-MBT<br>N.D. 4,6-DMDBT | 7.5 |
| 6 | Hg(NO$_3$)$_2$•H$_2$O + clay 0.041 g/0.2 g/5.0 mL | 232 ppmw 1-octene<br>364 ppm NP<br>N.D. 2-MBT<br>N.D. 4,6-DMDBT | 7.5 |

$^a$The low detection limit in this method using GC/MS is 1.5 ppmw of 2-MBT and 1.5 ppmw 4,6-DMDBT;
N.D. = Not detectable.

From the aforementioned working examples (Tables 1 to 4), it is found that the silicates of the present invention and activated carbon with metal nitrate salts can desulfurize liquid hydrocarbon fuels. However, activated carbon also removes olefinic hydrocarbons and other aromatic hydrocarbons as shown in entries 1, 2 and 3 in Table 4. Silicates with metal nitrates are, therefore, ideal sorbents for desulfurization of sulfur-containing liquid hydrocarbon fuels.

From the foregoing, it is to be appreciated that the compositions and methods of the present invention provide effective and cost-efficient desulfurization of liquid hydrocarbon fuels while substantially maintaining a minimum olefin saturation to provide a good octane number. The sulfur removal compositions and methods may be tailored for both refinery and non-refinery applications including on-site and on-board sulfur removal for fuel cell applications.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A method for removing sulfur compounds from liquid hydrocarbon fuels, comprising the steps of:
   providing a powdered sorbent composition comprised of one or more silicates and sulfur-affinitive metal nitrates;
   adsorbing the sulfur-compounds from a liquid hydrocarbon fuel by mixing the liquid hydrocarbon fuel with the powdered sorbent composition; and
   removing the powdered sorbent composition containing the adsorbed sulfur compounds from the liquid hydrocarbon fuels.

2. The method of claim 1, wherein the one or more silicates are selected from a group consisting of clays and silica gels, wherein the clays are selected from a group consisting of montmorillonite, laumonite, bentonite, Mica, vermiculite and kaolinite, and wherein the silica gels are selected from a group consisting of natural and synthetic molecular sieves, zeolites, and activated alumina.

3. The method of claim 1, wherein the one or more silicates have a particle size ranging from about ten to about one hundred micrometers.

4. The method of claim 1, wherein the sulfur-affinitive metal nitrates are selected from the group consisting of iron (II) or (III), zinc (II), cadmium (II) and mercury (II) nitrate.

5. The method of claim 1, wherein the powdered sorbent composition has about 5% to about 35% of sulfur-affinitive metal nitrates.

6. The method of claim 1, wherein the powdered sorbent composition has an average surface area of about 50 to about 350 $m^2/g$.

7. The method of claim 1, wherein the mixing step is done at a temperature of about 20 to about 50 C at atmospheric pressure.

8. The method of claim 1, wherein the sulfur compounds comprise sulfur-containing aromatic compounds.

9. The method of claim 8, wherein the sulfur-containing aromatic compounds are selected from the group consisting of thiophene, benzothiophene and dibenzothiophene and their alkylated derivatives.

10. The method of claim 1, wherein removal of the sulfur compounds is in a batch reactor, slurry reactor, packed bed reactor, fluidized bed reactor, or a fixed bed reactor.

11. A method of producing a low-sulfur liquid hydrocarbon fuel, comprising the steps of:
providing a powdered sorbent composition comprised of one or more silicates and sulfur-affinitive metal nitrates;
mixing the powdered sorbent composition with a liquid hydrocarbon fuel to substantially remove one or more sulfur compounds from the liquid fuel; and
removing the powdered sorbent composition and adsorbed sulfur compounds from the mixture to produce the low-sulfur liquid hydrocarbon fuel.

12. The method of claim 11, wherein the one or more silicates are selected from a group consisting of clays and silica gels, wherein the clays are selected from a group consisting of montmorillonite, laumonite, bentonite, Mica, vermiculite and kaolinite, and wherein the silica gels are selected from a group consisting of natural and synthetic molecular sieves, zeolites, and activated alumina.

13. The method of claim 12, wherein the one or more silicates have a particle size ranging from about ten to about one hundred micrometers.

14. The method of claim 11, wherein the sulfur-affinitive metal nitrates are selected from the group consisting of iron (II) or (III), zinc (II), cadmium (II) and mercury (II) nitrate.

15. The method of claim 11, wherein the powdered sorbent composition has an average surface area of about 50 to about 350 $m^2/g$.

16. The method of claim 11, wherein the mixing step is done at a temperature of about 20 to about 50° C. at atmospheric pressure.

17. The method of claim 11, wherein the sulfur compounds comprise sulfur-containing aromatic thiophene, benzothiophene and dibenzothiophene and their alkylated derivatives.

18. A method of removing sulfur-containing heterocyclic compounds from liquid hydrocarbon fuels comprising the steps of:
adding a liquid hydrocarbon fuel to one or more silicates and sulfur-affinitive metal nitrates to adsorb the sulfur-containing heterocyclic compounds in the liquid hydrocarbon fuels;
mixing the liquid hydrocarbon fuel, one or more silicates, and sulfur-affinitive metal nitrates;
removing the one or more silicates and sulfur-affinitive metal nitrates with the adsorbed sulfur-containing heterocyclic compounds after the mixing step.

19. The method of claim 18, wherein the mixing step is done at a temperature of about 20 to about 50° C. at atmospheric pressure.

20. The method of claim 18, wherein removal of the sulfur-containing heterocyclic compounds is in a batch reactor, slurry reactor, packed bed reactor, fluidized bed reactor or a fixed bed reactor.

* * * * *